United States Patent
Inudo et al.

(10) Patent No.: US 11,427,222 B2
(45) Date of Patent: Aug. 30, 2022

(54) VEHICLE

(71) Applicant: SUBARU CORPORATION, Tokyo (JP)

(72) Inventors: Shota Inudo, Tokyo (JP); Shunsuke Fukutomi, Tokyo (JP); Yukihiko Murakami, Tokyo (JP); Yoshiyuki Kambe, Tokyo (JP); Megumi Fushimi, Tokyo (JP); Kinya Nakayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 133 days.

(21) Appl. No.: 16/937,049

(22) Filed: Jul. 23, 2020

(65) Prior Publication Data

US 2021/0061308 A1 Mar. 4, 2021

(51) Int. Cl.
| | |
|---|---|
| *B60W 60/00* | (2020.01) |
| *G01C 21/34* | (2006.01) |
| *B60W 40/02* | (2006.01) |
| *B60W 40/08* | (2012.01) |

(52) U.S. Cl.
CPC ........ *B60W 60/0015* (2020.02); *B60W 40/02* (2013.01); *B60W 40/08* (2013.01); *G01C 21/3407* (2013.01)

(58) Field of Classification Search
CPC .. B60W 60/0015; B60W 40/02; B60W 40/08; G01C 21/3407
See application file for complete search history.

(56) References Cited

U.S. PATENT DOCUMENTS

| | | | | |
|---|---|---|---|---|
| 2013/0038437 | A1* | 2/2013 | Talati | G06Q 10/10 340/438 |
| 2015/0314793 | A1* | 11/2015 | Papajewski | B60W 50/0097 701/22 |
| 2017/0267256 | A1* | 9/2017 | Minster | B60W 50/085 |
| 2018/0335776 | A1* | 11/2018 | Theis | B60W 50/082 |
| 2019/0064843 | A1 | 2/2019 | Matsui et al. | |
| 2019/0324600 | A1* | 10/2019 | Wipperfürth | G06F 3/0484 |
| 2020/0378778 | A1* | 12/2020 | Glazberg | B60T 8/17 |
| 2020/0383580 | A1* | 12/2020 | Shouldice | A61B 5/1102 |
| 2021/0061308 | A1* | 3/2021 | Inudo | B60W 60/0015 |

FOREIGN PATENT DOCUMENTS

JP 2019-040459 A 3/2019

* cited by examiner

*Primary Examiner* — Hussein Elchanti

(74) *Attorney, Agent, or Firm* — McGinn I.P. Law Group, PLLC.

(57) ABSTRACT

A vehicle includes an in-vehicle activity information acquisition unit, a traveling road information acquisition unit, and a traveling route deriving unit. The in-vehicle activity information acquisition unit is configured to acquire in-vehicle activity information indicating content of an activity to be performed by an occupant in the vehicle while the occupant is traveling on the vehicle. The traveling road information acquisition unit is configured to acquire traveling road information indicating a state of a traveling road relating to a magnitude of an acceleration to be applied to the vehicle. The traveling route deriving unit is configured to derive a traveling route of the vehicle, on a basis of the in-vehicle activity information and the traveling road information.

20 Claims, 2 Drawing Sheets

| IN-VEHICLE ACTIVITY INFORMATION | PERMITTED VERTICAL ACCELERATION | PERMITTED HORIZONTAL ACCELERATION | PERMITTED FRONT-REAR ACCELERATION |
|---|---|---|---|
| READING BOOK | 0.10 G | 0.12 G | 0.15 G |
| HAVING MEAL | 0.05 G | 0.07 G | 0.10 G |
| DRAWING SKETCH | 0.01 G | 0.02 G | 0.05 G |

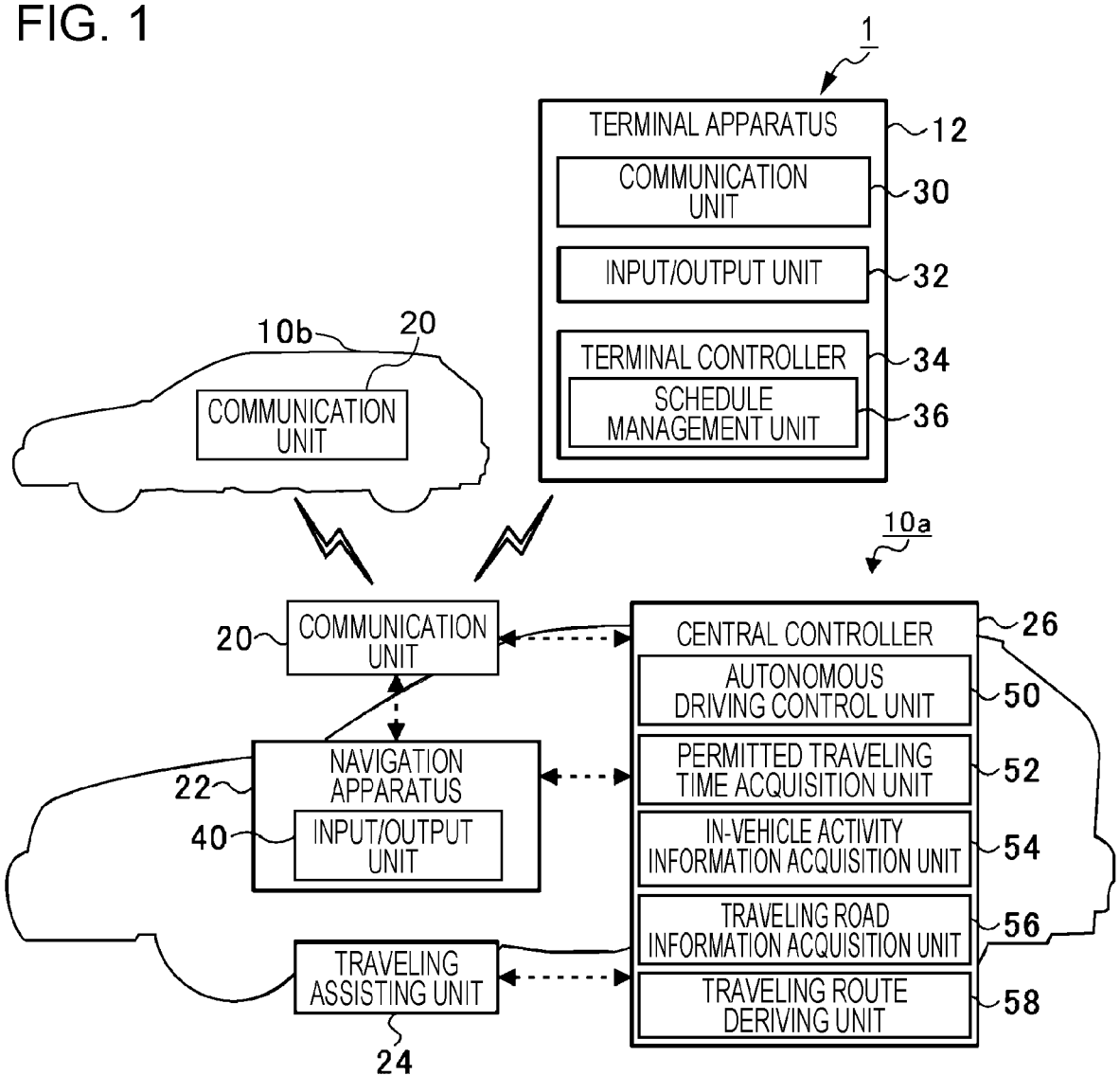

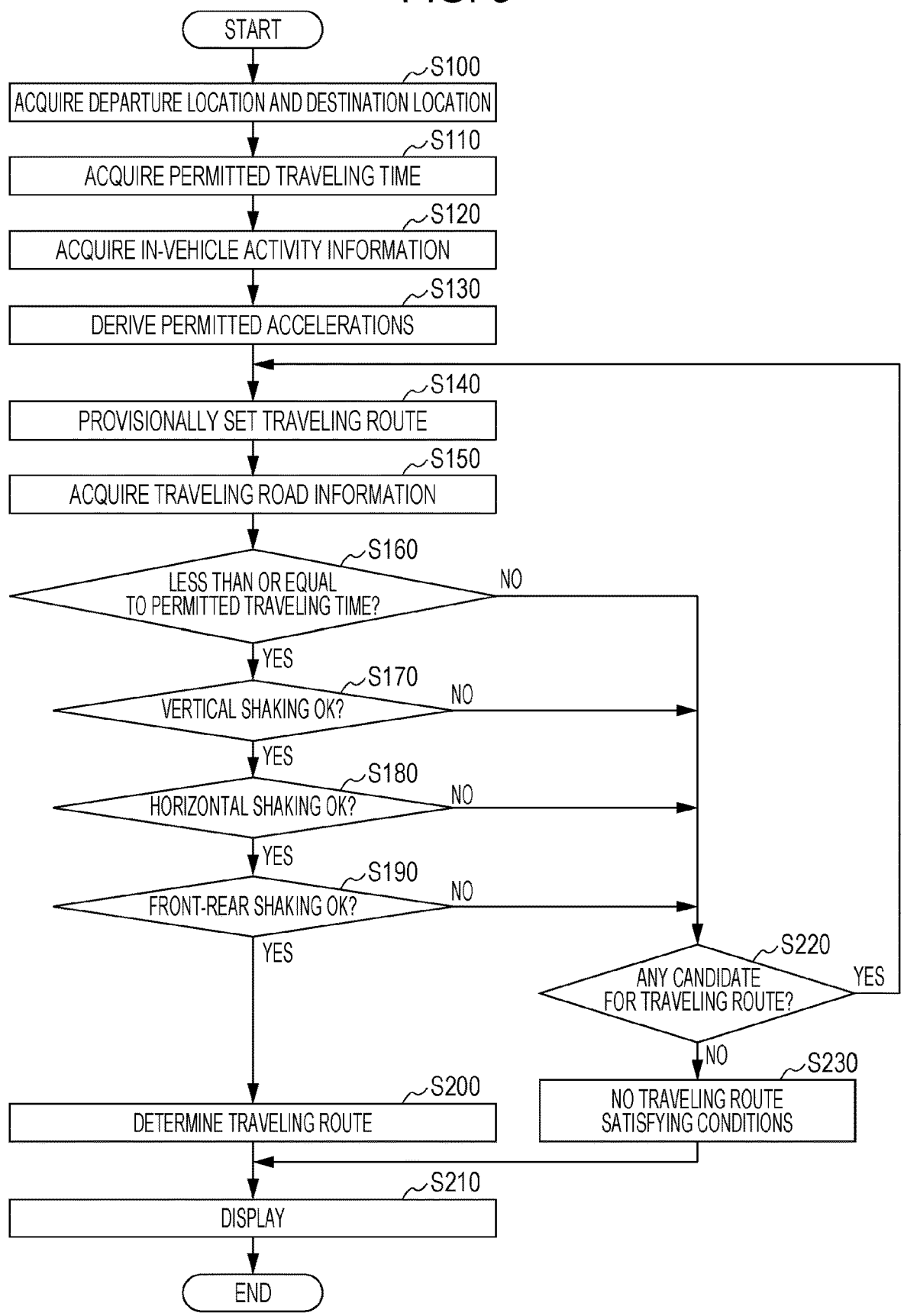

VEHICLE

CROSS-REFERENCE TO RELATED APPLICATIONS

The present application claims priority from Japanese Patent Application No. 2019-153749 filed on Aug. 26, 2019, the entire contents of which are hereby incorporated by reference.

BACKGROUND

The disclosure relates to a vehicle capable of traveling to a destination location by autonomous driving.

For example, Japanese Unexamined Patent Application Publication No. 2019-40459 discloses a passenger car (vehicle) capable of traveling to a destination location by autonomous driving without being driven by an occupant.

SUMMARY

An aspect of the disclosure provides a vehicle including an in-vehicle activity information acquisition unit, a traveling road information acquisition unit, and a traveling route deriving unit. The in-vehicle activity information acquisition unit is configured to acquire in-vehicle activity information indicating content of an activity to be performed by an occupant in the vehicle while the occupant is traveling on the vehicle. The traveling road information acquisition unit is configured to acquire traveling road information indicating a state of a traveling road relating to a magnitude of an acceleration to be applied to the vehicle. The traveling route deriving unit is configured to derive a traveling route of the vehicle, on a basis of the in-vehicle activity information and the traveling road information.

An aspect of the disclosure provides a vehicle including circuitry. The circuitry is configured to acquire in-vehicle activity information indicating content of an activity to be performed by an occupant in the vehicle while the occupant is traveling on the vehicle, acquire traveling road information indicating a state of a traveling road relating to a magnitude of an acceleration to be applied to the vehicle, and derive a traveling route of the vehicle, on a basis of the in-vehicle activity information and the traveling road information.

BRIEF DESCRIPTION OF THE DRAWINGS

The accompanying drawings are included to provide a further understanding of the disclosure and are incorporated in and constitute a part of this specification. The drawings illustrate an example of embodiments and, together with the specification, serve to explain the principles of the disclosure.

FIG. 1 is a schematic diagram illustrating a configuration of a traveling route setting system according to an example;

FIG. 2 is a diagram illustrating an example of a permitted acceleration table; and FIG. 3 is a flowchart describing a flow of an operation of deriving a traveling route.

DETAILED DESCRIPTION

Since an occupant of a vehicle capable of traveling to a destination location by autonomous driving is free of driving the vehicle, the occupant is able to do any activity such as drawing a sketch, for example, while traveling. However, depending on a traveling route such as in the case where the vehicle travels along a traveling route with large ups and downs or sharp turns, the activity performed by the occupant in the vehicle may be hindered by shaking of the vehicle.

Accordingly, it is desirable to provide a vehicle capable of traveling without hindering an activity of an occupant.

In the following, an example of embodiments of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a schematic diagram illustrating a configuration of a traveling route setting system 1 according to an example. The traveling route setting system 1 includes a vehicle 10a, a vehicle 10b, and a terminal apparatus 12. The vehicle 10a is a vehicle for which a traveling route is set, whereas the vehicle 10b is not a vehicle for which a traveling route is set. The vehicle 10a may also be hereinafter referred to a vehicle of interest, whereas the vehicle 10b may also be hereinafter referred to as another vehicle or the other vehicle.

The vehicle 10a for which a traveling route is set will be described in detail below. In addition, configurations and processes relating to the present example will be described in detail below, and description of configurations and processes not relating to the present example is omitted.

The vehicle 10a is an automobile capable of traveling to a destination location by autonomous driving without being driven by an occupant. The vehicle 10a includes a communication unit 20, a navigation apparatus 22, a traveling assisting unit 24, and a central controller 26.

The communication unit 20 of the vehicle 10a is capable of wirelessly communicating with the communication unit 20 of another vehicle (the vehicle 10b). That is, the vehicle 10a is capable of performing vehicle-to-vehicle communication with other vehicles. The communication unit 20 of the vehicle 10a is also capable of wirelessly communicating with the terminal apparatus 12.

The terminal apparatus 12 is, for example, a smartphone, a tablet terminal, or a personal computer. The terminal apparatus 12 includes a communication unit 30, an input/output unit 32, and a terminal controller 34.

The communication unit 30 of the terminal apparatus 12 is capable of wirelessly communicating with the vehicle 10a. The input/output unit 32 is, for example, a touch panel. The input/output unit 32 accepts an input operation performed by a user of the terminal apparatus 12, and displays various kinds of information. It is assumed herein that the user of the terminal apparatus 12 is an owner of the vehicle 10a, who may be an occupant of the vehicle 10a in some cases.

The terminal controller 34 is implemented by at least one semiconductor integrated circuit including a central processing unit (CPU), a read-only memory (ROM) that stores a program and so on, and a random access memory (RAM)

that serves as a work area, for example. The terminal controller 34 executes a schedule management application program to serve as a schedule management unit 36.

The schedule management unit 36 manages a schedule input by a user of the terminal apparatus 12 (an occupant of the vehicle 10*a*) via the input/output unit 32. That is, the RAM serves as the schedule management unit 36 and stores schedule information input by the user of the terminal apparatus 12. In the schedule information, a scheduled activity which the user of the terminal apparatus 12 is going to perform is registered in association with time.

For example, suppose that the user of the terminal apparatus 12 is a painter, and the user of the terminal apparatus 12 is going to start traveling on the vehicle 10*a* from the workplace to the home two hours later and to have a meal at home four hours later. It is assumed that the RAM that serves as the schedule management unit 36 stores schedule information indicating such a schedule.

Suppose that, for example, it is difficult for the user of the terminal apparatus 12 to complete an amount of work of drawing a sketch for today in two hours, and the user of the terminal apparatus 12 decides to draw the rest of the sketch while traveling on the vehicle 10*a*. The user of the terminal apparatus 12 then registers, in the schedule information stored in the schedule management unit 36, a schedule of drawing the sketch in the vehicle 10*a* in association with the traveling time on the vehicle 10*a* which has been registered in the schedule information.

As described above, the schedule information stored in the schedule management unit 36 may include in-vehicle activity information indicating content of an activity which the user of the terminal apparatus 12 (the future occupant of the vehicle 10*a*) is going to perform in the vehicle 10*a* while traveling on the vehicle 10*a*. Although drawing a sketch is used as a specific example of the in-vehicle activity information, the in-vehicle activity information is not limited to this example.

The navigation apparatus 22 of the vehicle 10*a* is capable of acquiring map information representing a map and traffic information indicating traffic restrictions or the like via the communication unit 20, for example. The navigation apparatus 22 includes an input/output unit 40. The input/output unit 40 is, for example, a touch panel. The input/output unit 40 accepts an input operation performed by the occupant of the vehicle 10*a*, and displays various kinds of information (such as map information and traffic information, for example).

The navigation apparatus 22 is capable of acquiring a departure location and a destination location through an input operation performed by the occupant via the input/output unit 40. When the departure location is the current location, the navigation apparatus 22 is also capable of acquiring the current location serving as the departure location using the Global Positioning System (GPS). The navigation apparatus 22 may prompt the occupant to input the in-vehicle activity information to acquire the in-vehicle activity information via the input/output unit 40.

Although illustrations are omitted, the traveling assisting unit 24 includes a driving mechanism such as a driving motor, a braking mechanism such as a brake, a steering mechanism such as a steering gear, and various sensors such as an acceleration sensor and a speed sensor. Although illustrations are omitted, the traveling assisting unit 24 may also include an image capturing apparatus that captures images of an environment outside the vehicle in the traveling direction or the like, and an outside-vehicle-environment recognition apparatus that recognizes the environment outside the vehicle on the basis of the images captured by the image capturing apparatus. The traveling assisting unit 24 performs driving of a vehicle of interest, such as acceleration, deceleration, and making turns, under control of the central controller 26.

The central controller 26 is implemented by at least one semiconductor integrated circuit including a CPU, a ROM that stores a program and so on, and a RAM that serves as a work area, for example. The central controller 26 executes a program to serve as an autonomous driving control unit 50, a permitted traveling time acquisition unit 52, an in-vehicle activity information acquisition unit 54, a traveling road information acquisition unit 56, and a traveling route deriving unit 58.

The autonomous driving control unit 50 controls autonomous driving along a traveling route derived by the traveling route deriving unit 58 (described later). For example, the autonomous driving control unit 50 acquires various kinds of information relating to driving, such as information on an environment outside the vehicle of interest, an acceleration of the vehicle of interest, a speed of the vehicle of interest, a rotation angular velocity of the driving motor, a traveling lane, map information, traffic information, and a traveling route. The autonomous driving control unit 50 also acquires, from another vehicle, various kinds of information regarding the other vehicle, such as a location of the other vehicle, an acceleration of the other vehicle, and a torque of the other vehicle. The autonomous driving control unit 50 collectively interprets the acquired various kinds of information and controls the traveling assisting unit 24 to perform autonomous driving of the vehicle of interest.

It is now assumed that, for example, an ID or address information of the terminal apparatus 12 is registered in advance in the central controller 26 of the vehicle 10*a*. It is also assumed that the central controller 26 of the vehicle 10*a* is capable of recognizing who the occupant is by using an ID of an entry key, a driver monitoring system, or the like. In this case, the central controller 26 of the vehicle 10*a* is capable of identifying the terminal apparatus 12 of the occupant when the occupant gets in the vehicle 10*a* and of communicating with the terminal apparatus 12.

The permitted traveling time acquisition unit 52 acquires schedule information of the occupant from the schedule management unit 36 of the terminal apparatus 12 via the communication unit 20. The permitted traveling time acquisition unit 52 acquires the departure location (current location) and the destination location of traveling on the vehicle of interest, which are included in the acquired schedule information of the occupant. For example, if the schedule indicating that traveling from the workplace to the home on the vehicle 10*a* is going to be started two hours later is registered as described above, the permitted traveling time acquisition unit 52 acquires the workplace as the departure location and acquires the home as the destination location.

As described above, the permitted traveling time acquisition unit 52 may acquire the departure location (current location) and the destination location via the navigation apparatus 22.

The permitted traveling time acquisition unit 52 also acquires permitted traveling time indicating time permitted to be taken for the occupant to travel on the vehicle of interest.

In one embodiment, the permitted traveling time acquisition unit 52 acquires the permitted traveling time included in the schedule information of the occupant acquired from the schedule management unit 36 of the terminal apparatus 12. For example, in the above-described example in which the occupant is going to start traveling from the workplace to the home on the vehicle 10a two hours later and have a meal at home four hours later, the permitted traveling time acquisition unit 52 acquires, as the permitted traveling time, two hours which is a difference between four hours later and two hours later.

Note that the permitted traveling time acquisition unit 52 may prompt the occupant to input the permitted traveling time via the input/output unit 40 of the navigation apparatus 22 to acquire the permitted traveling time. In addition, the permitted traveling time acquisition unit 52 may prompt the occupant to input scheduled departure time and scheduled arrival time to acquire the permitted traveling time.

The in-vehicle activity information acquisition unit 54 acquires in-vehicle activity information indicating content of an activity to be performed by the occupant in the vehicle of interest while the occupant is traveling on the vehicle of interest.

In one embodiment, the in-vehicle activity information acquisition unit 54 acquires the in-vehicle activity information included in the schedule information acquired from the schedule management unit 36. For example, in the above-described case where a schedule indicating that the occupant is going to draw a sketch in the vehicle 10a is registered, the in-vehicle activity information acquisition unit 54 acquires drawing a sketch as the in-vehicle activity information.

Note that there may be cases where an activity scheduled to be performed in the vehicle 10a during traveling is not registered in the schedule information when the occupant gets in the vehicle 10a. In these cases, even if the in-vehicle activity information acquisition unit 54 acquires the schedule information from the schedule management unit 36, the schedule information does not include the in-vehicle activity information. Thus, the in-vehicle activity information acquisition unit 54 fails to acquire the in-vehicle activity information. Accordingly, in the case where the schedule information does not include the in-vehicle activity information or the like, the in-vehicle activity information acquisition unit 54 may prompt the occupant to input an activity scheduled to be performed by the occupant in the vehicle 10a while the occupant is traveling via the input/output unit 40 of the navigation apparatus 22 to acquire the in-vehicle activity information.

The traveling road information acquisition unit 56 acquires, via the navigation apparatus 22, traveling road information indicating a state of a traveling road relating to the magnitudes of accelerations to be applied to the vehicle of interest. For example, the traveling road information is included in map information and traffic information. In this example, the traveling road information includes traveling road information relating to a change in acceleration in the vertical (up-down) direction of the vehicle 10a (that is, vertical shaking), traveling road information relating to a change in acceleration in the horizontal direction of the vehicle 10a (that is, horizontal shaking), and traveling road information relating to a change in acceleration in the front-rear direction of the vehicle 10a (that is, front-rear shaking). In one embodiment, the traveling road information relating to vertical shaking includes information on ups and downs and information on whether the road is paved. In one embodiment, the traveling road information relating to horizontal shaking includes information on turns. In one embodiment, the traveling road information relating to front-rear shaking includes information on the number of traffic lights relating to acceleration and deceleration in the traveling direction.

Note that the information on ups and downs of the traveling road may not be sufficiently acquired from map information and traffic information. In such a case, the traveling road information acquisition unit 56 may compensate for the traveling road information on the basis of the locations, accelerations, and torques of the other vehicles acquired from the other vehicles.

The traveling route deriving unit 58 derives a traveling route of the vehicle of interest on the basis of the permitted traveling time, the in-vehicle activity information, and the traveling road information.

For example, the traveling route deriving unit 58 determines magnitudes of shaking (accelerations) that are permitted for the occupant to perform the activity in the vehicle on the basis of the content of the in-vehicle activity information. Therefore, the traveling route deriving unit 58 derives a permitted vertical acceleration, a permitted horizontal acceleration, and a permitted front-rear acceleration on the basis of the in-vehicle activity information. The permitted vertical acceleration indicates the upper limit value of an allowable acceleration to be applied in the vertical (up-down) direction of the vehicle of interest. The permitted horizontal acceleration indicates the upper limit value of an allowable acceleration to be applied in the horizontal direction of the vehicle of interest. The permitted front-rear acceleration indicates the upper limit value of an allowable acceleration to be applied in the front-rear direction of the vehicle of interest. Hereinafter, the permitted vertical acceleration, the permitted horizontal acceleration, and the permitted front-rear acceleration may be collectively referred to as permitted accelerations in some cases. The traveling route deriving unit 58 derives the permitted accelerations in the respective directions by using a permitted acceleration table, for example.

FIG. 2 is a diagram illustrating an example of the permitted acceleration table. In the permitted acceleration table, the permitted vertical acceleration, the permitted horizontal acceleration, and the permitted front-rear acceleration are associated with in-vehicle activity information. In FIG. 2, examples of the permitted accelerations in the respective directions are illustrated in unit of the acceleration of gravity (G). Note that specific contents of the in-vehicle activity information and specific numerical values of the permitted accelerations in the respective directions in FIG. 2 are examples, and the in-vehicle activity information and the permitted accelerations are not limited to these examples.

The traveling route deriving unit 58 applies the in-vehicle activity information acquired by the in-vehicle activity information acquisition unit 54 to the permitted acceleration table to derive the permitted vertical acceleration, the permitted horizontal acceleration, and the permitted front-rear acceleration. For example, in the case of a schedule indicating drawing a sketch in the vehicle of interest during traveling, the traveling route deriving unit 58 derives, using the permitted acceleration table, a permitted vertical acceleration of "0.01 G", a permitted horizontal acceleration of "0.02 G", and a permitted front-rear acceleration of "0.05 G" for the in-vehicle activity information indicating "drawing a sketch".

In general, there are a plurality of traveling routes from the departure location to the destination location. The traveling route deriving unit 58 provisionally sets a traveling route from among a plurality of traveling route candidates, and determines whether the above-described permitted accelerations are satisfied if the vehicle of interest travels along the provisionally set traveling route (provisional traveling route). If the traveling route deriving unit 58 determines that the permitted accelerations are not satisfied for the provisional traveling route, the traveling route deriving unit 58 sets the provisional traveling route to another candidate and determines whether the permitted accelerations are satisfied again.

In one embodiment, the determination as to whether the permitted accelerations are satisfied if the vehicle of interest travels along the provisional traveling route is performed in a following manner. The traveling route deriving unit 58 acquires the traveling road information for the provisional traveling route via the traveling road information acquisition unit 56. The traveling route deriving unit 58 derives, on the basis of the acquired traveling road information, anticipated maximum accelerations which are maximum values of accelerations anticipated to be applied to the vehicle of interest if the vehicle of interest travels along the provisional traveling route. In the case where the anticipated maximum accelerations are less than or equal to the respective permitted accelerations, the traveling route deriving unit 58 determines that the permitted accelerations are satisfied if the vehicle of interest travels along the provisional traveling route.

For example, the traveling route deriving unit 58 anticipates, on the basis of the acquired traveling road information, a change in vertical acceleration, a change in horizontal acceleration, and a change in front-rear acceleration to be applied to the vehicle of interest if the vehicle of interest travels along the provisional traveling route. The traveling route deriving unit 58 derives, on the basis of the change in vertical acceleration to be applied to the vehicle of interest, the maximum value of the anticipated vertical acceleration (anticipated maximum vertical acceleration). The traveling route deriving unit 58 derives, on the basis of the change in horizontal acceleration to be applied to the vehicle of interest, the maximum value of the anticipated horizontal acceleration (anticipated maximum horizontal acceleration). The traveling route deriving unit 58 derives, on the basis of the change in front-rear acceleration to be applied to the vehicle of interest, the maximum value of the anticipated front-rear acceleration (anticipated maximum front-rear acceleration). The traveling route deriving unit 58 determines that the permitted accelerations are satisfied if the vehicle travels along the provisional traveling route, in the case where the anticipated maximum vertical acceleration is less than or equal to the permitted vertical acceleration, the anticipated maximum horizontal acceleration is less than or equal to the permitted horizontal acceleration, and the anticipated maximum front-rear acceleration is less than or equal to the permitted front-rear acceleration.

The traveling route deriving unit 58 also derives traveling time (anticipated traveling time) taken if the vehicle of interest travels along the provisional traveling route, on the basis of a traveling distance along the provisional traveling route and an average speed of traveling along the traveling route, for example. The average speed in this case is derived in consideration of the number of traffic lights and traffic restrictions, for example. The traveling route deriving unit 58 then determines whether the anticipated traveling time is less than or equal to the permitted traveling time. If the anticipated traveling time is not less than or equal to the permitted traveling time, the provisional traveling route is a traveling route for which the occupant fails to arrive at the destination location as scheduled. Thus, the traveling route deriving unit 58 sets another candidate as the provisional traveling route, and determines whether the anticipated traveling time is less than or equal to the permitted traveling time again.

The traveling route deriving unit 58 then determines, as the actual traveling route, the provisional traveling route that satisfies both the permitted accelerations and the permitted traveling time.

Note that there may be a plurality of provisional traveling routes that satisfy both the permitted accelerations and the permitted traveling time. Accordingly, the traveling route deriving unit 58 may set the provisional traveling route in an ascending order of the traveling distance from the departure location to the destination location. Consequently, the provisional traveling route with the shortest traveling distance is successfully determined as the actual traveling route from among the plurality of provisional traveling routes that satisfy the conditions. In this manner, a traveling route that satisfies both the permitted accelerations and the permitted traveling time and that is estimated to provide a good fuel efficiency (electric efficiency) is successfully selected.

FIG. 3 is a flowchart describing a flow of an operation of deriving a traveling route. The central controller 26 performs a series of processing steps illustrated in FIG. 3 when an occupant gets in the vehicle of interest, for example.

The permitted traveling time acquisition unit 52 first acquires the schedule information from the schedule management unit 36 of the terminal apparatus 12 via the communication unit 20, and acquires the departure location and the destination location included in the schedule information (S100). Note that the permitted traveling time acquisition unit 52 may acquire the departure location and the destination location via the navigation apparatus 22.

Then, the permitted traveling time acquisition unit 52 acquires the permitted traveling time of the occupant included in the schedule information acquired from the schedule management unit 36 (S110). Note that the permitted traveling time acquisition unit 52 may acquire the permitted traveling time input by the occupant via the navigation apparatus 22.

Then, the in-vehicle activity information acquisition unit 54 acquires the in-vehicle activity information of the occupant included in the schedule information acquired from the schedule management unit 36 (S120). Note that the in-vehicle activity information acquisition unit 54 may acquire the in-vehicle activity information input by the occupant via the navigation apparatus 22.

Then, the in-vehicle activity information acquisition unit 54 derives the permitted accelerations (the permitted vertical acceleration, the permitted horizontal acceleration, and the permitted front-rear acceleration) corresponding to the acquired in-vehicle activity information, with reference to the permitted acceleration table (S130).

Then, the traveling route deriving unit 58 provisionally sets a traveling route (sets a provisional traveling route) on the basis of the departure location and the destination location (S140). For example, the traveling route deriving unit 58 sets the provisional traveling route in an ascending order of the traveling distance from the departure location to the destination location. In this manner, a decrease in fuel efficiency (electric efficiency) is successfully suppressed.

Then, the traveling road information acquisition unit 56 acquires the traveling road information for the provisional traveling route, which is included in map information and traffic information of the navigation apparatus 22 (S150). Note that the traveling road information acquisition unit 56 may acquire the traveling road information for the provisional traveling route, by also using information on accelerations of other vehicles or the like in addition to the map information and the traffic information of the navigation apparatus 22.

Then, the traveling route deriving unit 58 derives the anticipated traveling time for the provisional traveling route, and determines whether the anticipated traveling time is less than or equal to the permitted traveling time (S160).

In the case where the anticipated traveling time is less than or equal to the permitted traveling time (YES in S160), the traveling route deriving unit 58 determines whether vertical shaking of the vehicle of interest is allowable in relation to the activity to be performed in the vehicle of interest during traveling if the vehicle of interest travels along the provisional traveling route (S170). For example, the traveling route deriving unit 58 derives the anticipated maximum vertical acceleration for the provisional traveling route on the basis of the traveling road information, and determines whether the anticipated maximum vertical acceleration is less than or equal to the permitted vertical acceleration.

In the case where vertical shaking is allowable (in the case where the anticipated maximum vertical acceleration is less than or equal to the permitted vertical acceleration) (YES in S170), the traveling route deriving unit 58 determines whether horizontal shaking of the vehicle of interest is allowable in relation to the activity to be performed in the vehicle of interest during traveling if the vehicle of interest travels along the provisional traveling route (S180). For example, the traveling route deriving unit 58 derives the anticipated maximum horizontal acceleration for the provisional traveling route on the basis of the traveling road information, and determines whether the anticipated maximum horizontal acceleration is less than or equal to the permitted horizontal acceleration.

In the case where horizontal shaking is allowable (in the case where the anticipated maximum horizontal acceleration is less than or equal to the permitted horizontal acceleration) (YES in S180), the traveling route deriving unit 58 determines whether front-rear shaking of the vehicle of interest is allowable in relation to the activity to be performed in the vehicle of interest during traveling if the vehicle of interest travels along the provisional traveling route (S190). For example, the traveling route deriving unit 58 derives the anticipated maximum front-rear acceleration for the provisional traveling route on the basis of the traveling road information, and determines whether the anticipated maximum front-rear acceleration is less than or equal to the permitted front-rear acceleration.

In the case where front-rear shaking is allowable (in the case where the anticipated maximum front-rear acceleration is less than or equal to the permitted front-rear acceleration) (YES in S190), the traveling route deriving unit 58 determines this provisional traveling route as the actual traveling route (S200). Then, the traveling route deriving unit 58 causes the input/output unit 40 of the navigation apparatus 22 to display the determined traveling route (S210) and ends the series of processing steps.

On the other hand, in the case where the anticipated traveling time is not less than or equal to the permitted traveling time (NO in S160), in the case where vertical shaking is not allowable (in the case where the anticipated maximum vertical acceleration is not less than or equal to the permitted vertical acceleration) (NO in S170), in the case where horizontal shaking is not allowable (in the case where the anticipated maximum horizontal acceleration is not less than or equal to the permitted horizontal acceleration) (NO in S180), or in the case where front-rear shaking is not allowable (in the case where the anticipated maximum front-rear acceleration is not less than or equal to the permitted front-rear acceleration) (NO in S190), the traveling route deriving unit 58 determines whether there is another candidate for the traveling route (S220).

In the case where there is another candidate for the traveling route (YES in S220), the process returns to step S140 in which the traveling route deriving unit 58 changes the provisional traveling route to the other candidate and sets the provisional traveling route again (S140). For example, the traveling route deriving unit 58 sets, as the current provisional traveling route, a traveling route with the next shortest traveling distance of the distance of the previously set provisional traveling route, and performs the processing of step S140 and subsequent steps again.

If there is no other candidate for the traveling route (NO in S220), the traveling route deriving unit 58 determines that there is no traveling route that satisfies the conditions (S230), causes the input/output unit 40 of the navigation apparatus 22 to display a message indicating so (S210), and ends the series of processing steps.

As described above, the traveling route deriving unit 58 of the vehicle 10*a* according to the present example derives the traveling route of the vehicle 10*a* on the basis of the in-vehicle activity information indicating content of an activity to be performed by the occupant in the vehicle 10*a* while the occupant is traveling on the vehicle 10*a* and of the traveling road information indicating the state of the traveling road relating to the magnitudes of accelerations to be applied to the vehicle 10*a*. That is, the traveling route deriving unit 58 derives, on the basis of the in-vehicle activity information, permitted accelerations which are accelerations that are allowable when the occupant performs the activity. The traveling route deriving unit 58 derives, on the basis of the traveling road information, anticipated maximum accelerations which are maximum values of accelerations anticipated to be applied to the vehicle 10*a* if the vehicle 10*a* travels along the traveling route. The traveling route deriving unit 58 then derives the traveling route for which the anticipated maximum accelerations are less than or equal to the respective permitted accelerations.

In this manner, a traveling route is determined in the vehicle 10*a* according to the present example such that shaking of the vehicle 10*a* does not reach a magnitude that hinders an activity to be performed in the vehicle 10*a*. Thus, the vehicle 10*a* according to the present example is able to travel without hindering the activity of the occupant, and the occupant is able to perform a desired activity in the vehicle 10*a* while traveling on the vehicle 10*a*.

In addition, the traveling route deriving unit 58 of the vehicle 10*a* according to the present example derives a traveling route for which traveling time that is anticipated (anticipated traveling time) is less than or equal to the permitted traveling time. Consequently, the vehicle 10*a* according to the present example is able to arrive at the destination location as scheduled by the occupant.

In addition, the in-vehicle activity information acquisition unit 54 of the vehicle 10*a* according to the present example acquires the in-vehicle activity information included in schedule information in which a future schedule of the occupant is registered. Consequently, the vehicle 10*a* according to the present example automatically determines the traveling route such that shaking of the vehicle of interest does not reach a magnitude that hinders the activity to be performed in the vehicle without requiring the occupant to input the in-vehicle activity information.

Note that the vehicle 10*a* according to the example described above derives the traveling route for which the anticipated traveling time is less than or equal to the permitted traveling time. However, in the case where there is no restriction on the permitted traveling time of the occupant, the determination as to whether the anticipated traveling time is less than or equal to the permitted traveling time may be omitted. This configuration can reduce the processing load, and enables the traveling route to be derived more quickly.

While the example of embodiments of the disclosure has been described above with reference to the accompanying drawings, it is needless to say that the embodiments of the disclosure are not limited to such an example. It is obvious that any person skilled in the art can conceive various modifications and corrections within the scope of the claims, and it should be understood that these modifications and corrections belong to the technical scope of the embodiments of the disclosure.

For example, in the example described above, the permitted traveling time acquisition unit 52 acquires the schedule information from the schedule management unit 36 of the terminal apparatus 12. However, a manner in which the schedule information is acquired is not limited to the configuration in which the schedule information is acquired from the terminal apparatus 12. For example, in a configuration in which the schedule management unit 36 is included in the navigation apparatus 22 or the like of the vehicle 10a, the schedule information may be acquired from the schedule management unit 36 of the vehicle 10a.

In addition, for example, the vehicle 10a may be equipped with an image capturing apparatus that captures images of the inside of the vehicle 10a. The in-vehicle activity information acquisition unit 54 may analyze the images of the activity performed by the occupant in the vehicle 10a that are captured by the image capturing apparatus and may determine what kind of activity the occupant has started to acquire the in-vehicle activity information.

The central controller 26 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the central controller 26 including the autonomous driving control unit 50, the permitted traveling time acquisition unit 52, the in-vehicle activity information acquisition unit 54, the traveling road information acquisition unit 56, and the traveling route deriving unit 58. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the units illustrated in FIG. 1.

The invention claimed is:

1. A vehicle comprising:
a central controller including;
a processor; and
a memory, the memory storing instructions to cause the processor to execute a program to control:
an in-vehicle activity information acquisition unit configured to acquire in-vehicle activity information indicating content of an activity to be performed by an occupant in the vehicle while the occupant is traveling on the vehicle;
a traveling road information acquisition unit configured to acquire traveling road information indicating a state of a traveling road relating to a magnitude of an acceleration to be applied to the vehicle; and
a traveling route deriving unit configured to derive a traveling route of the vehicle, on a basis of the in-vehicle activity information and the traveling road information,
wherein the traveling route deriving unit derives the traveling route of the vehicle according to the magnitude of the acceleration being less than a permitted acceleration, and
wherein the permitted acceleration is derived from a permitted acceleration table that changes based on the activity to be performed.

2. The vehicle according to claim 1, wherein the traveling route deriving unit is configured to:
derive, on the basis of the traveling road information, an anticipated maximum acceleration that is a maximum value of an acceleration anticipated to be applied to the vehicle in a case where the vehicle travels along the traveling route, and
derive the traveling route for which the anticipated maximum acceleration is less than or equal to the permitted acceleration.

3. The vehicle according to claim 1, further comprising a permitted traveling time acquisition unit configured to acquire permitted traveling time indicating time that is allowable when the occupant travels on the vehicle,
wherein the traveling route deriving unit is configured to derive the traveling route for which anticipated traveling tune is less than or equal to the permitted traveling time.

4. The vehicle according to claim 2, further comprising a permitted traveling time acquisition unit configured to acquire permitted traveling time indicating time that is allowable when the occupant travels on the vehicle,
wherein the traveling route deriving unit is configured to derive the traveling route for which anticipated traveling time is less than or equal to the permitted traveling time.

5. The vehicle according to claim 1, wherein the in-vehicle activity information acquisition unit is configured to acquire the in-vehicle activity information included in schedule information in which a future schedule of the occupant is registered.

6. The vehicle according to claim 2, wherein the in-vehicle activity information acquisition unit is configured to acquire the in-vehicle activity information included in schedule information in which a future schedule of the occupant is registered.

7. The vehicle according to claim 1, wherein the in-vehicle activity information acquisition unit is configured to acquire the in-vehicle activity information included in schedule information in which a future schedule of the occupant is registered, and
wherein the in-vehicle activity information acquisition unit prompts the occupant to input an activity scheduled to be performed by the occupant in the vehicle based on the schedule information missing the in-vehicle activity information.

8. The vehicle according to claim 1, wherein the magnitude of the acceleration includes:
a magnitude of a vertical acceleration;

a magnitude of a horizontal acceleration; and
a magnitude of a change in acceleration,
wherein the permitted acceleration table includes:
information on a plurality of the content of the activity; and
information on a permitted vertical acceleration, a permitted horizontal acceleration, and a permitted front-rear acceleration associated with each of the plurality of the content of the activity.

9. The vehicle according to claim 8, wherein the traveling road information acquisition unit compensates for the traveling road information on a basis of data of other vehicles that previously traveled the traveling route.

10. The vehicle according to claim 8, wherein the traveling route deriving unit derives the traveling route of the vehicle, on the basis of each of the magnitude of the vertical acceleration, the magnitude of the horizontal acceleration, and the magnitude of the change in acceleration being less than a permitted threshold upper value.

11. The vehicle according to claim 1, wherein the permitted acceleration table is iteratively compared with a plurality of provisional traveling routes until the traveling route is derived that satisfies the permitted acceleration of the permitted acceleration table for the activity.

12. The vehicle according to claim 1, wherein, the traveling route deriving unit iteratively checks a plurality of provisional traveling routes until one of the plurality of provisional traveling routes satisfies the permitted acceleration based on a comparison of the magnitude of the acceleration to be applied to the vehicle during the traveling route to the permitted acceleration table corresponding to the activity.

13. The vehicle according to claim 12, wherein, the traveling route deriving unit further checks that the one of the plurality of provisional traveling routes which satisfied the permitted acceleration also includes a maximum travel time less that a permitted travel time, the maximum travel time being determined by a permitted traveling time acquisition unit.

14. The vehicle according to claim 13, wherein, the traveling route deriving unit repeats the checking of the plurality of provisional traveling routes until one that satisfied both the permitted travel time and permitted acceleration is derived.

15. The vehicle according to claim 1, wherein the traveling route deriving unit acquires the traveling road information for a provisional traveling route via the traveling road information acquisition unit,
wherein the traveling route deriving unit derives, on the basis of the acquired traveling road information, anticipated maximum accelerations which are maximum values of accelerations anticipated to be applied to the vehicle if the vehicle of interest travels along the provisional traveling route, and
wherein, in a case where the anticipated maximum accelerations are less than or equal to the permitted acceleration, the traveling route deriving unit determines that the permitted accelerations are satisfied if the vehicle travels along the provisional traveling route.

16. The vehicle according to claim 15, wherein, the traveling route deriving unit iteratively checks a plurality of provisional traveling routes until one of the provisional traveling routes satisfies the permitted acceleration based on a comparison of accelerations of the traveling route to the permitted acceleration table corresponding to the activity.

17. The vehicle according to claim 1, wherein, the traveling route deriving unit iteratively checks a plurality of provisional traveling routes for provisional traveling routes that satisfy the permitted acceleration based on a comparison of the magnitude of the acceleration to be applied to the vehicle during the traveling route and the permitted acceleration table corresponding to the activity, and
wherein the provisional traveling routes that satisfy the permitted acceleration are output in ascending order according to a traveling distance.

18. The vehicle according to claim 1, wherein, the traveling route deriving unit iteratively checks a plurality of provisional traveling routes for provisional traveling routes that satisfy the permitted acceleration based on a comparison of the magnitude of the acceleration to be applied to the vehicle during the traveling route and the permitted acceleration table corresponding to the activity, and
wherein a provisional traveling route with a shortest travel time is selected of the provisional traveling routes that satisfies the permitted acceleration.

19. The vehicle according to claim 1, wherein the permitted acceleration table is different for each activity to be performed.

20. A vehicle comprising:
circuitry configured to:
acquire in-vehicle activity information indicating content of an activity to be performed by an occupant in the vehicle while the occupant is traveling on the vehicle;
acquire traveling road information indicating a state of a traveling road relating to a magnitude of an acceleration to be applied to the vehicle; and
derive a traveling route of the vehicle, on a basis of the in-vehicle activity information and the traveling road information,
wherein the traveling route of the vehicle is further derived according to the magnitude of the acceleration being less than a permitted acceleration, and
wherein the permitted acceleration is derived from a permitted acceleration table that changes based on the activity to be performed.

* * * * *